Patented July 20, 1926.

1,593,132

UNITED STATES PATENT OFFICE.

AUGUST NELSON, OF HOT SPRINGS, SOUTH DAKOTA.

METALLURGICAL COMPOSITION AND METHOD OF USING THE SAME.

No Drawing.   Application filed February 11, 1925. Serial No. 8,525.

This invention relates to a metallurgical composition and method of using the same.

In carrying out the invention, I mix six pounds of pulverized quartz rock and two quarts of water and boil the same for thirty minutes. I then strain the liquid from the residual quartz rock and after the filtrate is cooled, I add one-half pint of syrup made from water and granulated sugar. Syrup, molasses, honey or any similar saccharine substance is the equivalent of the sugar. The resulting solution is allowed to stand for a period of ten days and at the expiration of that time, I add to the solution (which now consists of about one quart) one and one-half ounces of muriatic acid. The solution is then ready to be used for the tempering of iron and converting the same into steel.

In using the solution the iron is heated to a cherry red or white heat, and then plunged into the solution. The hardness imparted to the iron is determined by the degree of heat imparted to the iron before its immersion, and the length of time it remains in the solution.

It is to be understood that the invention is not limited to the use of the particular proportions recited or the several ingredients named since these may be varied in minor respects while still retaining all of the advantages of the process. Consequently it is to be understood that the invention is not limited to the precise proportions or manner of use hereinbefore set forth, but that it includes within its purview whatever changes fairly come within the terms or the spirit of the appended claims.

Having described my invention, what I claim is:—

1. The herein described composition for the treatment of iron, consisting of water in which pulverized quartz rock has been boiled, granulated sugar and muriatic acid.

2. The herein described composition for use in the treatment of iron, consisting of water in which pulverized quartz rock has been boiled, a saccharine substance and muriatic acid.

3. The herein described composition for use in the treatment of iron, consisting of the filtrate secured by boiling six pounds of pulverized quartz rock in two quarts of water for thirty minutes and then filtering off the liquid, a saccharine substance and muriatic acid.

4. The herein described composition for use in the treatment of iron, consisting of the filtrate secured by boiling six pounds of pulverized quartz rock in two quarts of water for thirty minutes and then filtering off the liquid, a saccharine substance and one and one-half ounces of muriatic acid.

5. The herein described composition for use in the treatment of iron, consisting of the filtrate secured by boiling six pounds of pulverized quartz rock in two quarts of water for thirty minutes and then filtering off the liquid, one-half pint of a saccharine substance and one and one-half ounces of muriatic acid.

6. The herein described composition for use in the treatment of iron, consisting of the filtrate secured by boiling six pounds of pulverized quartz rock in two quarts of water for thirty minutes and then filtering off the liquid, one-half pint of a saccharine substance and one and one-half ounces of muriatic acid, the acid being added to the remainder of the solution after the latter has stood for about ten days.

In testimony whereof he affixes his signature.

AUGUST NELSON.